(12) United States Patent
Pinnavaia et al.

(10) Patent No.: US 7,449,164 B2
(45) Date of Patent: Nov. 11, 2008

(54) SYNTHETIC LAYERED SILICATE NANOLAYERS

(75) Inventors: Thomas J. Pinnavaia, East Lansing, MI (US); Mihai Polverejan, Pennington, NJ (US)

(73) Assignee: Board of Trustees of Michigan State University, East Lansing, MI (US)

( * ) Notice: Subject to any disclaimer, the term of this patent is extended or adjusted under 35 U.S.C. 154(b) by 423 days.

(21) Appl. No.: 11/191,785

(22) Filed: Jul. 28, 2005

(65) Prior Publication Data

US 2006/0021945 A1 Feb. 2, 2006

Related U.S. Application Data

(60) Provisional application No. 60/592,282, filed on Jul. 29, 2004.

(51) Int. Cl.
*C01B 33/40* (2006.01)
*C01B 33/38* (2006.01)

(52) U.S. Cl. .................................. 423/326; 423/331
(58) Field of Classification Search ................. 423/326, 423/331

See application file for complete search history.

(56) References Cited

U.S. PATENT DOCUMENTS 5,993,769 A * 11/1999 Pinnavaia et al. ........... 423/331
7,132,165 B2 * 11/2006 Pinnavaia et al. ........... 428/404

* cited by examiner

*Primary Examiner*—David M Brunsman
(74) *Attorney, Agent, or Firm*—Ian C. McLeod

(57) ABSTRACT

Nanolayered layered silicate materials of octahedrally arranged units with divalent metal ions at centers of the units covalently linked above and below to tetrahedrally arranged oxygen and hydroxyl units with silicon atoms. The silicate materials contain silanol groups which are reactive to form derivative compositions useful for water purification to remove heavy meal cations.

9 Claims, 5 Drawing Sheets

Prepared from Silica Gel

SYNTHETIC LAYERED SILICATE NANOLAYERS

CROSS-REFERENCE TO RELATED APPLICATIONS

This application claims priority to Provisional Patent Application Ser. No. 60/592,282, filed Jul. 29, 2004.

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention relates to novel synthetically derived nanolayered silicate compositions with different structural units in adjacent nanolayers. In particular, the present invention relates to octahedral metal oxide nanolayers covalently linked to tetrahedral silicate nanolayers so that numerous silanol groups are present in the silicate nanolayers. The silanol groups are reactive to form derivative products particularly useful for removing heavy metals from contaminated water.

(2) Description of Related Art

The smectite family of layered silicate minerals, the so-called "swelling clays", have theoretical surface areas of 700 meters square per gram or larger, depending on equivalent weight. However, accessing this surface area for important materials applications such as chemical catalysis, adsorption, and polymer-clay nanocomposite formation is not readily achievable, primarily because the elementary one-nanometer thick nanolayers stack one upon the another to form tactoids. This stacking behavior leading to tactoid (aggregate) formation is detected through the appearance of a 001 reflection in the X-ray powder pattern of the clay. Tactoid formation results in the mutual shielding of the basal plane surfaces of the majority of nanolayers, making the theoretical surface area generally inaccessible. For a typical smectite clay, such as montmorillonite, the surface area experimentally determined by nitrogen adsorption methods is limited to values in the range 1-50 square meters per gram. In order to achieve access to the interlayer regions of clay tactoids, the tactoids can be swelled by swelling solvent, thereby exposing the basal surfaces to potential guest molecules in the solution. However, the use of a swelling solvent to access the basal plane surface area is inconvenient and limits the applications to only swelling solvents.

Smectite clays can be pillared through the intercalation of robust cations such as in the gallery regions of the tactoids, but this approach to improving the available surface area also has severe limitations because the pillars themselves occupy the basal surfaces of the clay. Moreover, pillared clays have limited pore sizes pore sizes that exclude the adsorption of molecules with kinetic diameters above about 1.0 nanometer.

One promising approach to opening up the basal surfaces of smectite clays is to prevent the stacking of the nanolayers and avoiding tactoids formation. This relationship between nanolayers can be approximated by limiting the in-plane growth of the nanolayers in one direction so that the nanolayers are lath-shaped rather than disk-shaped, as is typical of most smectite clay minerals. Lath shaped nanolayers, such as those found for certain grades of synthetic laponite, (M. L. Occelli et al. J. Catal., 90, 256, 1984; J. Catal., 104, 331, 1987) tend to form edge-to-basal plane aggregates in a card house fashion, but the stacking of laponite nanolayers is never completely prevented. Another example of limited nanolayer stacking has been disclosed by Vogels et al. in patent WO 9607613. In this latter system, the stacking of synthetic saponite layers was limited from one nanolayer (that is, no nanolayers stacking) to not more than 20 nanolayers in a stacked tactoid. No explanation was provided for the limited stacking of nanolayers, but it is likely that the size of the nanolayers was limited in the in-plane directions, thus facilitating aggregation of the nanolayers in a card-house fashion.

The formation of nanolayered silicate phases in unstacked form holds great promise for applications in chemical catalysis, adsorption, polymer-nanocomposite formation, among many other materials applications. The usefulness of the such unstacked compositions would be greatly expanded if stacking could be prevented for nanolayers with an aspect ratio substantially greater than the aspect ratio of laponite (~25) and more comparable to the aspect ratio of montmorillonite (>200). However, this is especially difficult to accomplish for large aspect ratio layered silicates because of the strong tendency of such large nanolayers to stack. A new process other than the card house mechanism is needed to prevent layer stacking for layered silicates with a large aspect ratio.

OBJECTS OF THE INVENTION

It is an object of the present invention to provide reactive layered silicate materials which have a novel nanolayered physical structure and reactive silanol groups. In particular, it is further an object of the present invention to provide a process which economically and reliably prepares the nanolayered silicate compositions. These and other objects will become increasingly apparent by reference to the following description and the drawings.

SUMMARY OF THE INVENTION

The present invention relates to a synthetically derived silicate composition consisting of elementary nanolayers formed from a central sheet of octahedrally arranged oxygen units with divalent metal cations occupying positions at centers of the octahedral units (the octahedral sheet), said octahedral sheets being covalently linked above and below by sheets of tetrahedrally arranged oxygen and hydroxyl units with silicon atoms occupying positions in the center of each tetrahedral array of oxygens (the tetrahedral sheets), characterized in that the dimensions of the elementary nanolayers varies from 1 to 200 nanometers, the elementary nanolayers being aggregated into particles less than 2 micrometers in dimension, the number of stacked elementary three-sheet nanolayers varying from predominately one nanolayer (unstacked nanolayers) to no more than five nanolayers, while in the octahedral sheet at most 16 percent of the octahedral units are vacant and while in the tetrahedral silicate sheets at least 5 percent and up to 35 percent of the silicon atoms are linked to hydroxyl groups. Preferably in the octahedral sheet the divalent metal cations are selected from the group consisting of magnesium, zinc, nickel, cobalt, iron, manganese, and combinations thereof are present as divalent cations. Preferably nanolayers have a deficiency of positive charge which is comprised of divalent cations on the surfaces of the nanolayers. Preferably the exchangeable divalent cations on the surface of the nanolayers are replaced by an inorganic cation, an organic onium ion, or a metal complex cation.

The present invention also relates to organofunctional derivatives of the compositions, wherein surface silanol groups on the tetrahedral sheet of the nanolayers are converted to organosilyl groups by reaction with an organosilane grafting reagent, the organosilyl group optionally comprising oxygen, nitrogen, boron, phosphorus, sulfur, halogen, and combinations thereof covalently bonded to carbon. Preferably the organosilyl groups contain oxygen, nitrogen, halogen, sulfur, phosphorous, boron and combinations thereof bonded to carbon.

The present invention also relates to a process for the preparation of the composition previously described comprising the formation of a reaction mixture containing a silica source, a divalent metal oxide source, water in an amount effective in forming a paste or slurry, and optionally a base, wherein a molar ratio of silica source to divalent metal oxide source is between 1.33 and 1.60, allowing the mixture to react at a temperature between 60 and 225° C. for an amount of time effective in forming the compositions as a reaction product, and recovering the composition by filtration, centrifugation, or by evaporation of the liquid phase. Preferably the silica source is selected from the group consisting of amorphous silica, silica gel, fumed silica, diatomaceous earth and combinations thereof. Preferably the divalent metal oxide source is selected from the group consisting of magnesium oxide, cobalt oxide, nickel oxide, ferrous oxide, manganese oxide, and zinc oxide. Preferably the base, when present, is selected from the group consisting of ammonium hydroxide, sodium hydroxide, and combinations thereof. Preferably the molar ratio of base to divalent metal oxide source is between 0.0 and 2.0.

The present invention also relates to a process for the preparation of the organofunctional compositions comprising reacting the compositions described above in non-aqueous suspension with a organosilane grafting reagent at an elevated temperature and for a reaction time effective in transforming surface silanol groups on the tetrahedral sheet of the nanolayers into organosilyl groups linked to the surface through a covalent Si—O—Si bond, recovering the solid phase by filtration or centrifugation, washing away excess grafting reagent with a non-aqueous solvent and drying the product to produce the composition. Preferably the organosilane grafting reagent is selected from the group consisting of $R_{4-z}SiX_z$ compositions, wherein X is a leaving group selected from the group consisting of halogen, alkoxide, and amide, z is an integer between 1 and 3, R is an organo group covalently linked to silicon through a covalent C—Si bond, and wherein one or more R groups optionally comprise oxygen, nitrogen, halogen, sulfur, phosphorous, boron and combinations thereof covalently bonded to carbon.

The present invention also relates to a process for the removal of heavy metal cations from contaminated water which comprises passing a steam of the contaminated water through a packed bed of the organofunctional composition at a rate of flow effective in removing the heavy metal cations.

The present invention particularly relates to a process for the removal of heavy metal cations from contaminated water wherein a composition according to claim 6 in powder form is suspended in the contaminated water at a concentration and for a time effective in adsorbing the heavy metal cations from solution and removing the composition by filtration, sedimentation, centrifugation, or a combination thereof.

DESCRIPTION OF PREFERRED EMBODIMENTS

Figure 1:
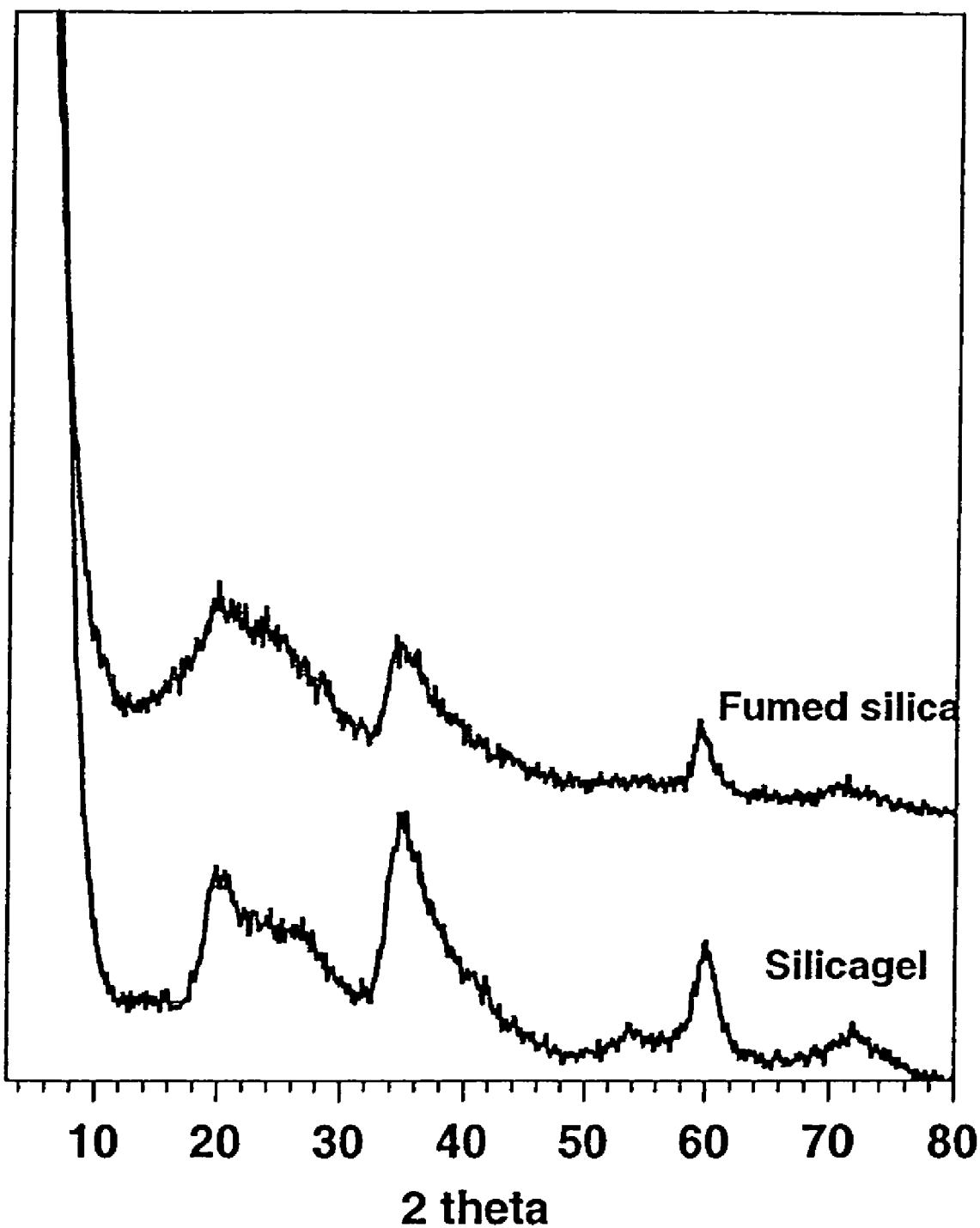
FIG. 1 is a graph showing XRD patterns of pre-exfoliated nanolayers prepared from fumed silica and silica gel according to Examples 1 and 3.

The present invention provides for low-cost synthetic layered silicate phases primarily in pre-exfoliated, unstacked nanolayer form, thus providing for a surface area in excess of 500 meters square per gram and facilitating access to the basal surfaces of the nanolayers for applications in chemical catalysis, adsorption and polymer nanocomposite formation. The nanolayers are formed from a central sheet of octahedrally-arranged oxygen units with divalent metal cations occupying positions at the centers of the octahedral units (the octahedral sheet), said octahedral sheets being covalently linked above and below to sheets of tetrahedrally arranged oxygen units with silicon atoms occupying the center of each tetrahedral unit (the tetrahedral sheets). Moreover, a fraction of the silicon atoms comprising the tetrahedral sheets are hydroxylated and accessible for grafting reaction with organosilane grafting reagents, thereby allowing the pre-exfoliated nanolayers to be functionalized with organosilyl moieties that optionally can comprise oxygen, nitrogen, halogen, phosphorus, sulfur, and boron covalently bonded to carbon. Synthetic methods for the preparation of the nanolayers are described which provide for reproducible compositions, particle sizes, and surface areas.

The 2:1 arrangement of tetrahedral to octahedral sheets comprising the exfoliated nanolayers of this invention also is shared by other layered silicate compositions, most notably the smectite clays, vermiculite, talc, kerolite (a turbostratic form of talc) and the micas. Evidence for this structural relationship is provided by the presence of hk0 reflections analogous to those found for turbostratic forms of the known 2:1 layered silicates mentioned above. However, the layered silicate compositions of the present invention differ from these known compositions in two respects. Firstly, virtually absent in the x-ray powder patterns of the new layered silicates of this invention are 001 x-ray reflections corresponding to stacked nanolayers (tactoids). Secondly, the new layered silicate compositions of this invention contain silanol groups in the tetrahedral sheets. These two features, taken together, make the compositions of the present art unique.

Synthetic saponite clays have been reported in patent WO9607613 that do not exhibit 001 x-ray reflections owing to the lack of nanolayers stacking. But the nanolayers of these pre-exfoliated saponites conform to the conventional 2:1 smectite clay structure wherein the tetrahedral sheet is devoid of silanol groups. Although saponite and other conventional 2:1 layered silicate minerals contain two structural hydroxyl groups per $O_{20}$ $(OH)_2$ unit cell, these hydroxyl groups are bonded exclusively to metal atoms comprising the octahedral sheet. The silicon atoms comprising the tetrahedral sheets of conventional 2:1 layered silicates are bonded exclusively to oxygen atoms that bridge to other metal atoms in the tetrahedral sheet and to metal atoms in the octahedral sheet, save for the very small fraction of silicon atoms that bridge to hydrogen atoms and form terminal silanol groups at the layer edges. The fraction of silicon atoms that are bonded to layer-edge hydroxyl groups in conventional 2:1 layered silicates is so small (<1% of all the silicon atoms) that they go undetected by silicon NMR spectroscopy.

The compositions of the present invention are distinguished from conventional 2:1 layered silicates in that a substantial fraction of silicon atoms in the tetrahedral sheets are bonded to hydroxyl groups at a concentration that is readily detected by silicon 29 NMR spectroscopy. For the compositions of the present invention, at least 5 percent, but not more than 35 percent, of the total silicon atoms comprising the tetrahedral sheets of the nanolayers are bonded to hydroxyl groups.

Figure 5A:
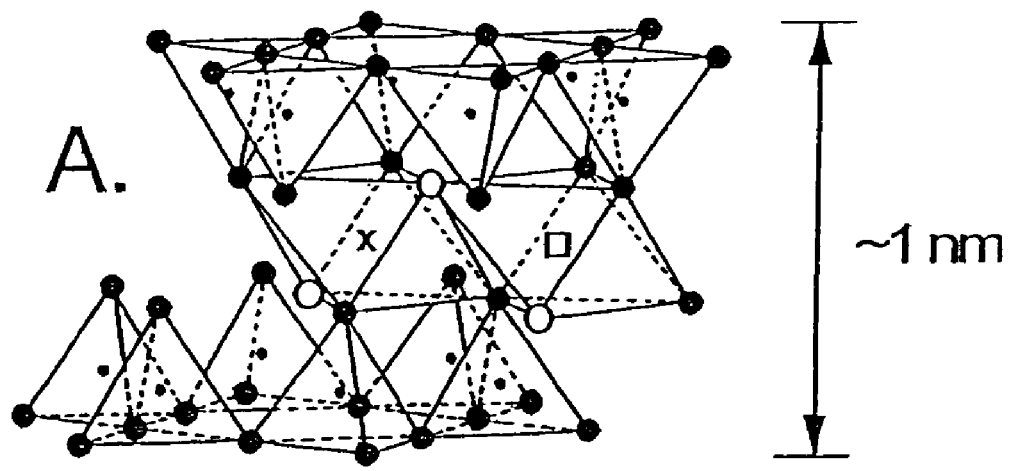
FIG. 5A is a sketch of a 2:1 layered silicate of a normal structure.

The exact structure of the synthetic 2:1 layered silicates of the present invention is uncertain. However, the presence of an appreciable fraction of surface silanol groups is an intrinsic feature of the structure which distinguishes our new 2:1 layer composition from conventional 2:1 layered silicate compositions. The presence of the surface silanol groups indicate that defects in a conventional 2:1 structure are introduced through the inversion of silicon centers in the tetrahedral sheet. Shown in the structure in FIG. 5A is the oxygen framework of a normal 2:1 layered silicate. In this FIG. 5A, the solid and dashed lines are guides to the eye in delineating the octahedral and tetrahedral sheets defining the layered structure. The filled and open large circles are the positions of the space filling oxygen atoms and hydroxyl groups respectively, that define the oxide framework. The small circles are the silicon atoms in tetrahedral interstacies within the oxygen framework. Octahedral interstacies occupied by divalent cations are marked with an X. Occasionally, these octahedral positions are vacant, as denoted by the open square. Note that none of the hydroxyl groups are used to define tetrahedral sites in the framework, which means there are no bonds between the silicon atoms and hydroxyl groups in a conventional 2:1 layered silicate structure.

Figure 5B:
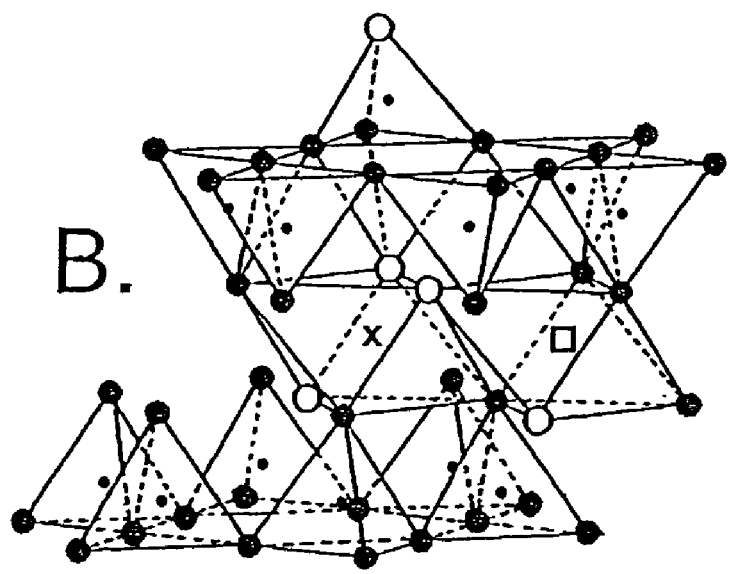
FIG. 5B is a proposed sketch of a modified or "defective" 2:1 layered silicate structure.

As shown in the structure of FIG. 5B, we speculate that the silanol-bearing synthetic layered silicates of the present invention have a modified or "defective" 2:1 layered silicate structure, wherein a fraction of the silicon atoms adopt inverted orientations with respect to the tetrahedral sheet (see open circles at top of FIG. 5B) As shown in FIG. 5B, this occasional inversion of silicon results in the formation of a covalent bond between silicon and a hydroxyl group which is not present in a conventional 2:1 layered silicate structure.

As shown in structure B we speculate that the silanol-bearing synthetic layered silicates of the present invention have a modified or "defective" 2:1 layered silicate structure, wherein a fraction of the silicon atoms adopt inverted orientations with respect to the tetrahedral sheet (see open circles at top of sketch B). As shown in sketch B this occasional inversion of silicon results in the formation of a covalent bond between silicon and a hydroxyl group which is not present in a conventional 2:1 layered silicate structure.

The nanolayers of the present invention are further characterized in that the dimensions of the elementary nanolayers varies from 1 to 200 nanometers. Also, the elementary nanolayers are aggregated into particles less than 2 micrometers in dimension. Another characteristic feature of the compositions of this invention is that the elementary nanolayers are predominantly unstacked, resulting in the virtual absence of a 001 x-ray reflection or, if the said reflection is present, it is exceptionally broad in comparison to the observable hk0 in-plane reflections in the powder pattern. In any case, the intensity of the 001 reflection, if present, is substantially weaker than the 060 reflection that appears near a two-theta angle of 60 degrees in the x-ray powder diffraction pattern of the composition when copper K-alpha radiation is used as the x-ray source. Further, no more than five elementary nanolayers can stacked into tactoids, as estimated from the Scherrer equation which, as described in the examples. The Scherrer equation relates the line width of a reflection to size of the scattering domain. The predominance of unstacked nanolayers is further verified by transmission electron microscopy, as described further in the examples.

The lack of nanolayer stacking for the layered silicate compositions of this invention is related to the extraordinary bonding of the silicon atoms in the tetrahedral sheet to hydroxyl groups. However, the orientation of the resulting silanol groups in the tetrahedral sheet is not completely known. At least a fraction of the tetrahedral silanol groups of the nanolayer point away from the basal planes of the nanolayers, because it is possible to graft organo siloxane units to some, though not all, of the silanol groups in the tetrahedral sheet through reaction with a silane grafting reagent As described in the examples, the accessibility and reactivity of at least a fraction of the basal plane silanol groups allows the basal surfaces of the nanolayers to be organo functionalized for use in many different materials applications. When the grafted organo group contains a mercaptan moiety, for example, the resulting organo derivative is an effective trapping agent for the removal of toxic divalent mercury ions from water solutions. Many other toxic heavy metals can also be removed for water using mercaptan—functional derivative of the nanolayers. Organo derivatives containing oxygen, nitrogen, phosphorus, halogen, and boron as heteroatoms also are possible. Because some of the silanol units of the nanolayers are not accessible for grafting reaction with organo silane grafting agents, it is possible that a fraction of the silanols in the tetrahedral sheet also are oriented toward the octahedral sheet of the nanolayers, rendering them inaccessible for grafting reaction. On the other hand, the unreactive silanols of the tetrahedral sheets might be sterically shielded by the organosilanes that already have been linked through covalent bonds to the basal planes of the nanolayers. However, we do not want to be bound to any one theory regarding the orientation of the inaccessible silanol groups of the nanolayers.

The octahedral sheet of the nanolayers of this invention are occupied by divalent metal cations, $M^{2+}$. The divalent metal ions are selected from the group consisting of magnesium, zinc, nickel, cobalt, iron, manganese, and combinations thereof. The preferred divalent cation is magnesium. When all of the octahedral interstacies are occupied by divalent metal ions, the $Si/M^{2+}$ molar ratio is 1.333. Although not all of the octahedral interstacies need to be filled by divalent cations, at most 16 percent of the octahedral units can be vacant. With regard to the composition of the tetrahedral sheet, all of the tetrahedral interstacies are filled by silicon and at most 35 percent of the tetrahedral silicon centers can contain a hydroxyl group.

Depending on the number of silanol groups contained in the tetrahedral sheet and the number of divalent cations occupying the octahedral sheet, the nanolayers can have a deficiency of positive charge which is compensated by exchangeable divalent cations on the surfaces of the nanolayers. The exchangeable divalent cations on the surface of the nanolayers may be replaced by an inorganic cation, an organic onium ion, or a metal complex cation.

The preparation of the compositions of the present invention comprises the formation of a reaction mixture containing a silica source, a divalent metal oxide source, water in an amount effective in forming a paste or slurry, and optionally a base, wherein the molar ratio of silica source to divalent metal oxide source is between 1.33 and 1.60, allowing the mixture to react at a temperature between 60 and 225° C. for an amount of time effective in forming the compositions, and recovering the reaction product by filtration, centrifugation, or by evaporation of the liquid phase. The silica is selected from the group consisting of amorphous silica, silica gel, fumed silica, diatomaceous earth and combinations thereof. Fumed silica is generally preferred. The divalent metal oxide source is selected from the group consisting of magnesium oxide, cobalt oxide, nickel oxide, ferrous oxide, manganese oxide, and zinc oxide. The base, when present, is selected from the group consisting of ammonium hydroxide, sodium hydroxide, and combinations thereof. The molar ratio of base to divalent metal oxide source is between 0.0 and 2.0.

The preparation of the organofunctional derivatives of this invention is accomplished by reacting the nanolayers in non-aqueous suspension with a organosilane grafting reagent at an elevated temperature and for a reaction time effective in transforming surface silanol groups on the tetrahedral sheet of the nanolayers into organosilyl groups linked to the surface through a covalent Si—O—Si bond, recovering the solid phase by filtration or centrifugation, washing away excess grafting reagent with a non-aqueous solvent and drying the product. The organosilane grafting reagent is selected from the group consisting of $R_{4-z}SiX_z$ compositions, wherein X is a leaving group selected from the group consisting of halogen, alkoxide, and amide, z is an integer between 1 and 3, R is an organo group covalently linked to silicon through a covalent C—Si bond, and wherein one or more R groups optionally contain oxygen, nitrogen, halogen, sulfur, phosphorous, boron and combinations thereof covalently bonded to carbon.

Owing to the presence of divalent cation vacancies in the octahedral sheet, the layers can bear a positive charge deficiency that is balanced by exchangeable cations on the basal surfaces of the nanolayers. The exchangeable divalent cations on the surface of the nanolayers are replaced by an inorganic cation, an organic onium ion, or a metal complex cation, thus broadening the range of surface polarity available for various materials applications of the nanolayers. However, owing to the presence of silanol groups in place of bridging oxygen atoms in the tetrahedral sheet of the nanolayers the cation exchange capacity is substantially less than the cation exchange capacity characteristic of smectite clays. Whereas the smectite clays typically exhibit cation exchange capacities in the range 70-120 milliequivalents per 100 grams, the cation exchange capacities are in the range 0.0 to not more than about 40 milliequivalents per 100 grams.

EXAMPLE 1

This example illustrates the preparation of a nanolayered silicate composition of this invention when magnesium is the divalent cation that occupies octahedral positions in the octahedral sheet of the three-sheet nanolayers. A reaction mixture containing of 18.14 mmoles (1.09 g) of fumed silica (Aerosil 380 from Degussa, 50 mL of distilled water, to 13.6 mmoles (0.55 g) magnesium oxide and 0.12 moles $NH_4OH$ (15 g of 30% solution) was stirred at 90° C. for a period of 17 hours. The resulting slurry was dried to a powder in an oven at 100° C.

EXAMPLE 2

In this example the preparation of Example 1 was repeated, except that the ammonium hydroxide was omitted from the reaction mixture. The resulting slurry was dried as described in Example 1.

EXAMPLES 3 AND 4

In these examples the fumed silica source of Examples 1 and 2, respectively, was replaced by a silica gel (Degussa OX 50), but the reaction stoichiometry, reaction conditions and the recovery of the reaction products was the same as described in the earlier examples.

EXAMPLES 5 AND 6

In these examples the silica source of Example 1 and 2 was replaced by diatomaceous earth, but the reaction stoichiometry, reaction conditions and the recovery of the reaction products was the same as described in the earlier examples.

EXAMPLES 7 AND 8

These examples illustrate the x-ray diffraction (XRD) patterns, nitrogen adsorption-desorption isotherms, silicon 29 NMR spectra and transmission electron micrograph (TEM) images for typical silicate compositions of this invention made from fumed silica (Example 7) and from silica gel (Example 8) as the source of the silicon that occupies the tetrahedral positions in the tetrahedral sheets and magnesium oxide as the source of the divalent cations that occupy octahedral positions in the octahedral sheet. For both compositions the Si/Mg molar ratio was 1.33, as in examples 1-6. This ratio is equivalent to the ratio found in the 2:1 layered silicate talc and kerolite, but the structure of the compositions differs from talc. As shown by the XRD patterns in FIG. 1 using copper K-alpha radiation (wavelength=0.15418 nanometers), the compositions made from fumed silica and silica gel are very similar. Both compositions exhibit many of the in-plane diffraction peaks found for kerolite, which is a turbostratic form of talc. As is observed for naturally occurring kerolite ("Crystal Structures of Clay Minerals and their X-Ray Identification" by G. W. Bindley and G. Brown, Mineralogical Society (London), 1980, pp 166-167), the observed in-plane reflections are broad with the 02,11 reflections occurring near two-theta scattering angles between 20 and 28 degrees, the 13, 20 reflections near 25 degrees, the 04, 22 reflections near 40 degrees, the 15, 24, 31 reflections near 55 degrees, the 06, 33 reflections near 60 degrees and the 25, 40 reflections near 72 degrees. Notably absent are the 001, 002 and 003 reflections which occur near two theta values of 10, 18 and 28 degrees in natural kerolite. The absence of these latter diffraction peaks indicate that nanolayers are not regularly stacked, or if stacking does occur, there are fewer than about five nanolayers in a stack, causing extreme broadening of the reflections in the stacking direction. According to the Scherrer equation ("Crystal Structures of Clay Minerals and their X-Ray Identification" by G. W. Bindley and G. Brown, Mineralogical Society (London), 1980, p 131), The width of the 001 reflection at half maximum amplitude, which occurs near a two-theta scattering angle of 10 degrees for copper K alpha radiation (0.154 nanometer wavelength) should be 4.0 degrees if the stacking of nanolayers averaged only two layers were stacked (2.0 nanometer scattering domain) and 1.5 degrees if the average stack size was five nanolayers (5.0 nanometer scattering domain). Because diffraction lines with a width of 1.5 degrees should be easily observed, the absence of well-expressed 001 reflections in the XRD patterns of the reaction products indicates that the average stacking of nanolayers must be substantially less than five layer and even less than even two layers. That is, the vast majority of primary nanolayers in both reaction products are unstacked.

Figure 2A:
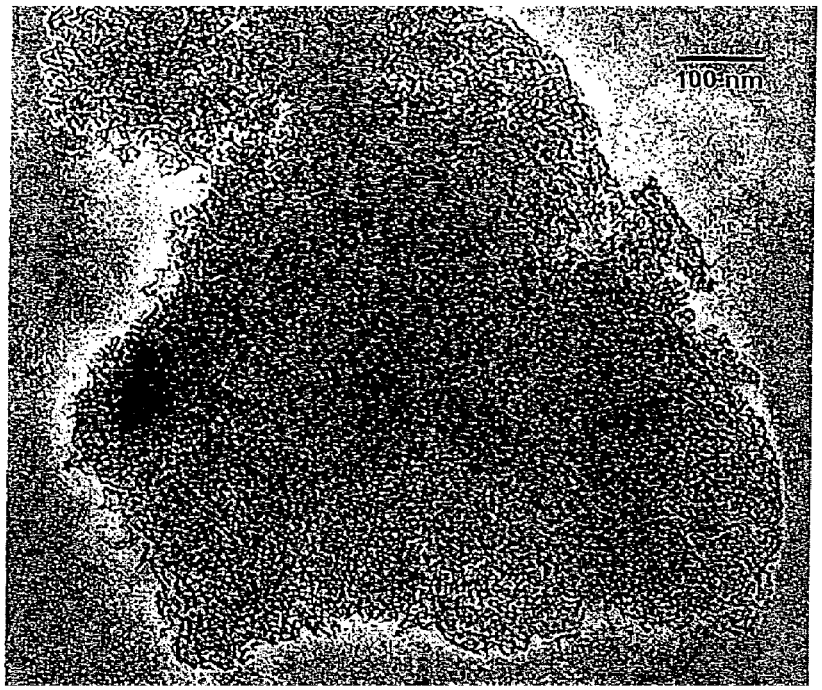
FIGS. 2A and 2B are TEM images of the nanolayered silicates prepared from fumed silica and silica gel according to Examples 1 and 3.
Figure 2B:
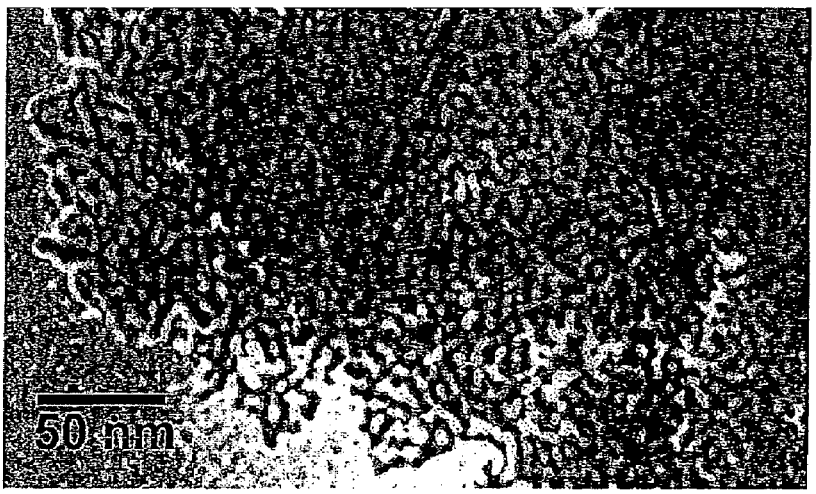

The predominance of unstacked primary nanolayers for both reaction products was verified by the TEM images provided in FIGS. 2A and 2B. The product made from silica gel is comprised of elementary particles from 1 to about 10 nanometers in dimension. The elementary particles are intergrown and aggregated into secondary particles in the micrometer size range. The elementary particles are too small to reveal the lamellar nature of the crystal structure. Also there is no substantial stacking of the elementary particles. However, the lamellar structure of the product made from fumed silica is clearly expressed in the TEM micrographs. Although the nanolayers are wrinkled, the dimensions of the nanolayers extends from 1 nanometer up to about 200 nm. Also, there is no substantial stacking of the nanolayers, despite the fact that the nanolayers are aggregated into secondary particles in the micrometer size range.

Figure 3:
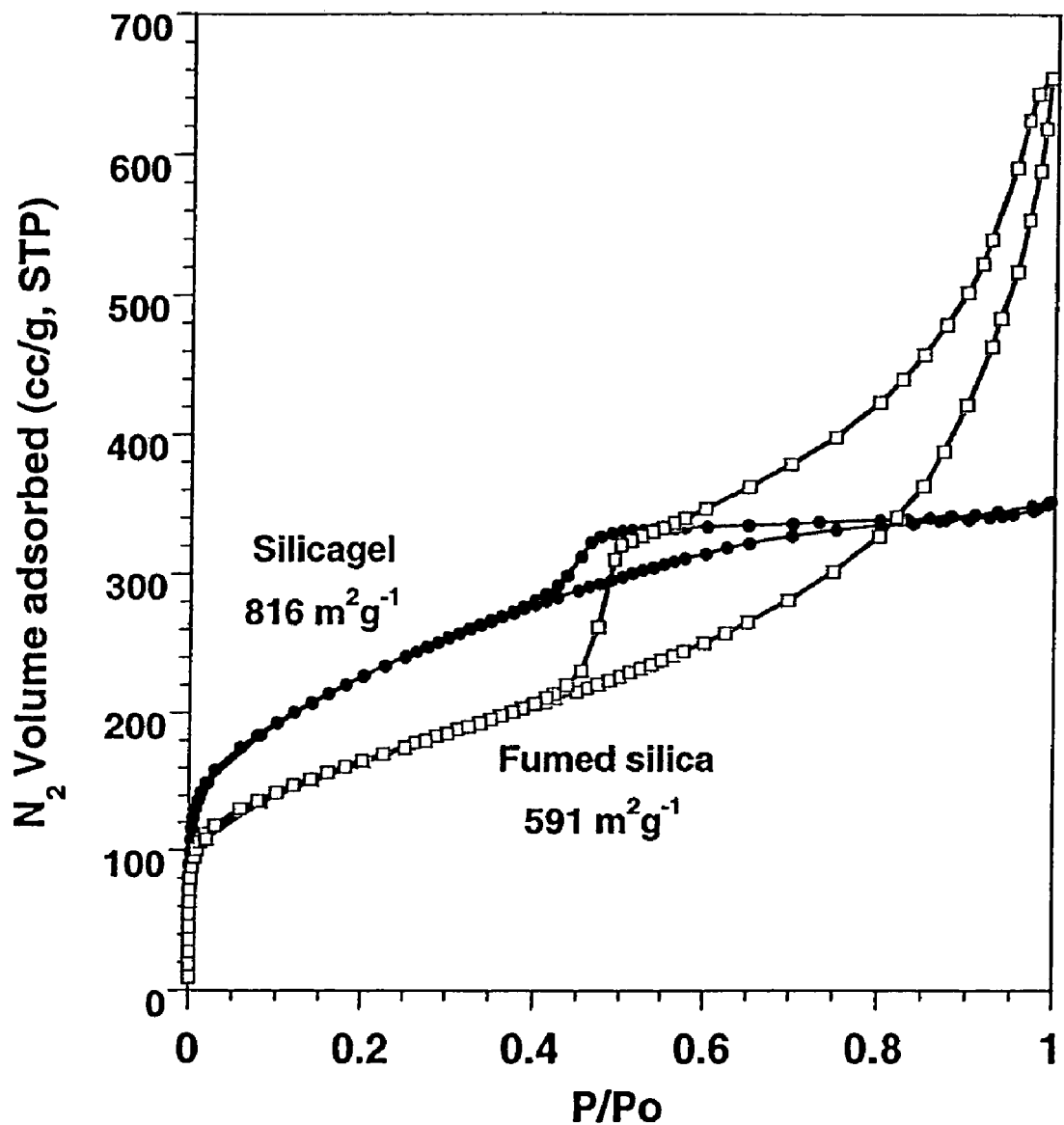
FIG. 3 is a graph showing nitrogen adsorption-desorption isotherms prepared from fumed silica and silica gel according to Examples 1 and 3.

Nitrogen adsorption-desorption isotherms are shown in FIG. 3 for the nanolayered silicates prepared from fumed silica and silica gel. The differences in the shapes of the isotherms reflects the differences in the textures observed by TEM. The BET surface areas were 590 and 816 square meters per gram for the nanolayers compositions formed from fumed silica and silica gel, respectively.

Compositions with properties analogous to those found for the above nanolayed magnesiosilicate nanolayers are found for compositions in which the magnesium is replaced in part or in total by divalent cobalt, nickel, iron, zinc, manganese, and combinations thereof. Also, increasing the Si to divalent metal ion ratio up to a value of 1.6 is effective in producing compositions with analogous properties.

Figure 4:
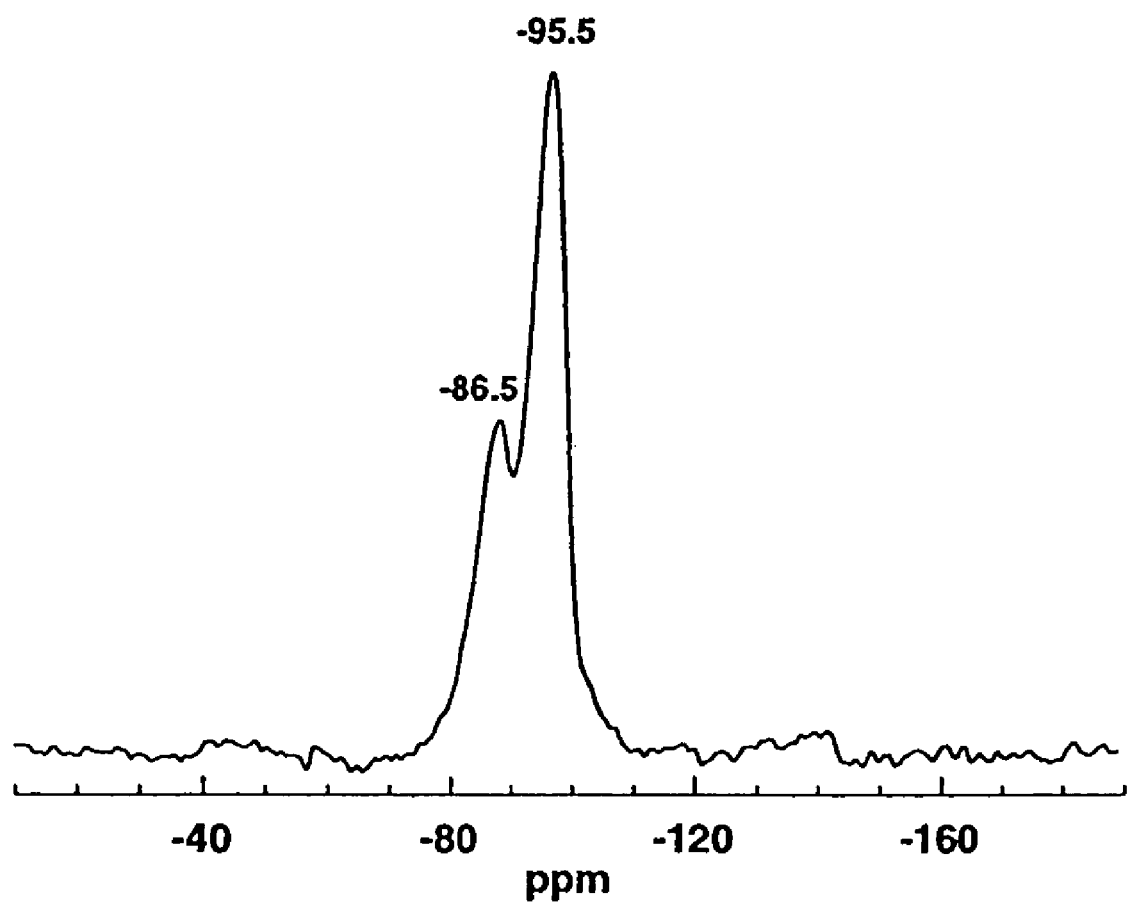
FIG. 4 is a graph showing a silicon 29 NMR spectrum of the nanolayered silicate composition prepared according to Example 1.

The silicon 29 NMR spectrum for the nanolayers composition made from fumed silica according to Example 1 is shown in FIG. 4. A similar spectrum was observed for the analogous composition made from silica gel. The resonance line at −95.5 ppm is assigned to Q3 silicon centers in the tetrahedral sheet wherein the silicon atom is bonded to three oxygen atoms that bridge to adjacent silicon atoms in the tetrahedral sheet and the fourth oxygen bridges to a metal atom center in the octahedral sheet. The resonance line with a chemical shift of −86.5 ppm is assigned to tetrahedral silanol groups in the tetrahedral sheet that are linked to at least one hydroxyl group, in addition to being linked to oxygen atoms that bridge to adjacent silicon atoms in the tetrahedral sheet. Deconvolution of the −86.5 and −95.5 ppm resonances indicated a relative intensity of 28:72, which corresponds to 28 percent of the silicon atoms in the tetrahedral sheet being in the form of silanol centers. The relative intensities of these two resonances can be adjusted upward or downward depending on the initial reaction stoichiometry and reaction temperature. Unequivocal evidence in support of the silanol assignment for the −86.5 ppm resonance was provided by a proton cross polarization experiment which resulted in the dramatic increase in the intensity of this resonance in comparison to the Q3 resonance at −95.5 ppm. The presence of silanol centers in the tetrahedral sheet distinguishes the compositions of this invention from conventional 2:1 layer silicate compositions which do not have silanol linkages present in the tetrahedral sheet.

EXAMPLE 9

This example describes an organosilyl derivative of the composition prepared according to Example 1. A one-gram sample of the magnesiosilicate was dried under vacuum at 120° C., and then allowed to react with a 50 mL solution CHCl₃ containing 3 g of mercaptopropyltrimethoxysilane (MPTMS). After 24 hours at 60° C. the product was filtered and washed with copious amounts of CHCl₃ followed by ethanol to remove ungrafted MPTMS and then dried in air at room temperature. The resulting composition exhibited an silicon 29 NMR pattern that contained a low field resonance indicative of grafted organosilyl group covalently linked to the nanolayers, a silanol resonance at −86.5, and a Q3 resonance at −95.5 ppm. However, in comparison the NMR spectrum of the initial nanolayers composition before silylation, the intensity of the silanol resonance at −86.5 ppm was which was greatly reduced in intensity relative to the −95.5 ppm, as expected for the conversion of a substantial fraction of the surface silanol groups to organo silyl groups. The BET surface area of the mercaptopropyl-functionalized derivative was 290 square meters per gram and the pore volume was 0.16 cc per gram. A slurry of the mecaptan-functionalized derivative quantitatively removed divalent mercury cations from water solution up to a binding capacity of about 0.8 mmole of mercury per gram of organosilyl trapping agent. Equivalent removal of divalent mercury from water is achieved when the trapping agent is in the form of a packed bed column and a solution of mercury is passed through the column at ambient temperature.

It is intended that the foregoing description be only illustrative of the present invention and that the present invention be limited only by the hereinafter appended claims.

We claim:

1. A synthetically derived silicate composition consisting of elementary nanolayers formed from a central sheet of octahedrally arranged oxygen units with divalent metal cations occupying positions at the centers of the octahedral units to provide an octahedral sheet, said octahedral sheets being covalently linked above and below by sheets of tetrahedrally arranged oxygen and hydroxyl units with silicon atoms occupying positions in the center of each tetrahedrally arranged oxygens (the tetrahedral sheets), wherein dimensions of the elementary nanolayers vary from about 1 to 200 nanometers, the elementary nanolayers being aggregated into particles less than about 2 micrometers in dimension, the number of stacked elementary three-sheet nanolayers varying from predominately one nanolayer as unstacked nanolayers to no more than five nanolayers, while in the octahedral sheet up to 16 percent of the octahedrally arranged oxygen units are vacant and while in the tetrahedral silicate sheets at least 5 percent and up to 35 percent of the silicon atoms are linked to hydroxyl groups.

2. The silicate composition according to claim 1, wherein in the octahedral sheet the divalent metal cations are selected from the group consisting of magnesium, zinc, nickel, cobalt, iron, manganese, and combinations thereof.

3. The compositions of claim 1 or claim 2 characterized by the nanolayers having a deficiency of positive charge which is comprised of divalent cations on surfaces of the nanolayers.

4. The compositions of claim 3, wherein the exchangeable divalent cations on the surface of the nanolayers are replaced by an inorganic cation, an organic onium ion, or a metal complex cation.

5. A process for the preparation of the composition of claim 1, 2, or 3 comprising the formation of a reaction mixture containing a silica source, a divalent metal oxide source, water in an amount effective in forming a paste or slurry, and optionally a base, wherein a molar ratio of silica source to divalent metal oxide source is between 1.33 and 1.60, allowing the mixture to react at a temperature between 60° and 225° C for an amount of time effective in forming the composition as a reaction product, and recovering the composition by filtration, centrifugation, or by evaporation of the liquid phase.

6. The process of claim 5, wherein the silica source is selected from the group consisting of amorphous silica, silica gel, fumed silica, diatomaceous earth and combinations thereof.

7. The process of claim 5, wherein the divalent metal oxide source is selected from the group consisting of magnesium oxide, cobalt oxide, nickel oxide, ferrous oxide, manganese oxide, and zinc oxide.

8. The process of claim 5, wherein the base, when present, is selected from the group consisting of ammonium hydroxide, sodium hydroxide, and combinations thereof.

9. The process of claim 8, wherein the molar ratio of base to divalent metal oxide source is between 0.0 and 2.0.

* * * * *

UNITED STATES PATENT AND TRADEMARK OFFICE
CERTIFICATE OF CORRECTION

PATENT NO. : 7,449,164 B2  Page 1 of 1
APPLICATION NO. : 11/191785
DATED : November 11, 2008
INVENTOR(S) : Thomas J. Pinnavaia and Mihai Polverejan It is certified that error appears in the above-identified patent and that said Letters Patent is hereby corrected as shown below:

On the title page, item [57]: Abstract, last line, "heavy meal cations" should be --heavy metal cations--.

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,449,164 B2  
APPLICATION NO. : 11/191785  
DATED : November 11, 2008  
INVENTOR(S) : Thomas J. Pinnavaia et al.

Page 1 of 1

It is certified that error appears in the above-identified patent and that said Letters Patent is hereby corrected as shown below:

Column 5, line 50, "structure B" should be --the structure of Figure 5B--.

Column 5, line 55, "sketch B" should be --Figure 5B--.

Column 5, line 55, "sketch B" should be --Figure 5B--.

Signed and Sealed this
Twenty-fourth Day of April, 2012

David J. Kappos
*Director of the United States Patent and Trademark Office*